Dec. 4, 1928.                                           1,693,997
J. J. CARTER
METHOD OF MAKING COMMUTATORS
Filed May 21, 1925

Inventor
John J. Carter
By Spencer Sewall & Hardman
Attorneys

Patented Dec. 4, 1928.

1,693,997

UNITED STATES PATENT OFFICE.

JOHN J. CARTER, OF LANSING, MICHIGAN, ASSIGNOR, BY MESNE ASSIGNMENTS, TO DELCO-REMY CORPORATION, OF DAYTON, OHIO, A CORPORATION OF DELAWARE.

METHOD OF MAKING COMMUTATORS.

Application filed May 21, 1925. Serial No. 31,959.

This invention relates to commutators for dynamo-electric machines, and particularly for small electric motors.

One of the objects of the present invention is to improve the method of manufacture in order to reduce waste of material and to shorten the time required for preparing certain materials for the process.

Further objects and advantages of the present invention will be apparent from the following description, reference being had to the accompanying drawings, wherein a preferred form of embodiment of the present invention is clearly shown.

Figure 1:
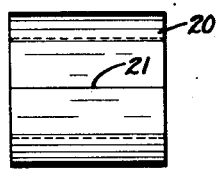
Fig. 1 is a side view of a tube of copper used for forming the segments of the commutator.
Figure 3:
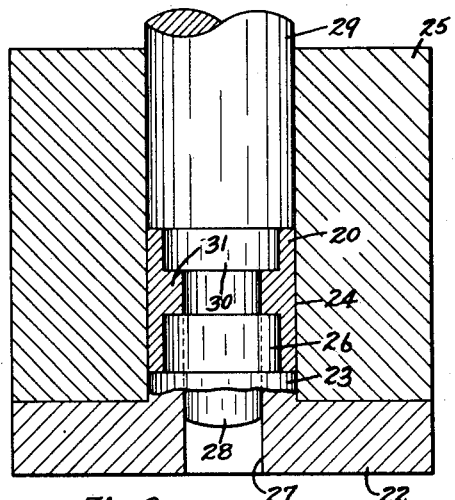
Figs. 2, 3 and 4 show steps in the process of squeezing the tube shown in Fig. 1 so as to form on the interior of the tube an annular tang forming flange.
Figure 2:
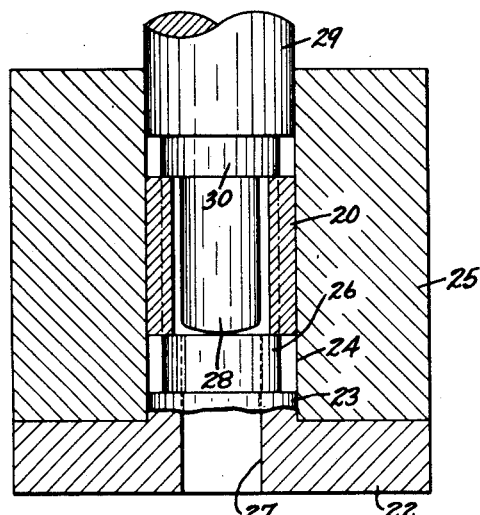

The tube 20 shown in Fig. 1 may be formed by cutting off a section of a longer tube of copper or other commutator metal. The more economical method of forming the tube 20 is to bend a rectangular flat piece of copper into a tube having a butt joint at the line 21. The forming members shown in Figs. 2 and 3 include a die base 22 which is provided with a circular boss 23 which fits snugly within a hole 24 in the die block 25 which supports the side walls of the tube 20. The die base 22 is provided wih a cylindrical portion 26 having an external diameter greater than the internal diameter of the original tube 20 and less than its external diameter. The base 22 is provided with a hole 27 extending centrally within the base 22 and portion 26 for receiving the pilot member or mandrel 28 of an upper die member 29 which fits snugly within the hole 24 of the block 25. The upper die member 29 is provided with a cylindrical portion 30 which cooperates with the portion 26 of the base in order to squeeze a tubular band of metal of the tube 20 to provide on the interior thereof an annular flange 31 which is rectangular cross-section as shown in Fig. 3.

Figure 4:
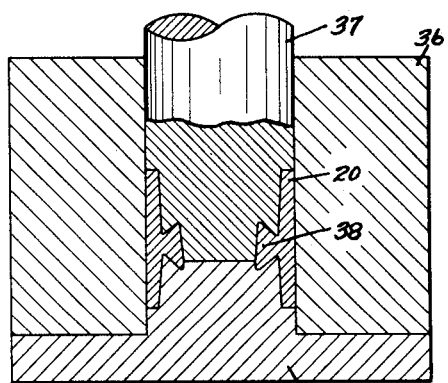

The work is removed from the die members 22, 25 and 29 and is squeezed between die members 35, 36 and 37 which provide the work 20 with an annular commutator tang forming portion 38 which is dove-tail shape in cross section as shown in Fig. 4.

The work is removed from the dies 35, 36 and 37 and is slit longitudinally, but not entirely through the side walls thereof in order to leave a ring portion 39, which maintains in spaced relation a plurality of commutator segments 40 each having an anchoring tang 41. The slots 42 which space the segments 40 are generally equi-distant, and one of them is made through the butt joint 21, in case a seamless tubing is not used.

Figure 6:
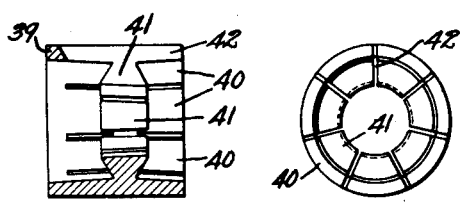
Figs. 5 and 6 are sectional and end views respectively of the tube after it has been swaged and slit longitudinally to divide the tube in plurality of commutator segments which are united by a ring of metal at one end of the tube.
Figure 5:
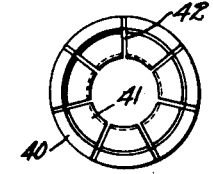
Figure 8:
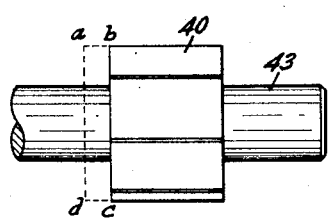
Fig. 8 is a side view of the commutator when completed.
Figure 7:
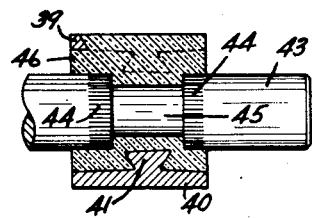
Fig. 7 is a longitudinal sectional view showing the tube attached to a shaft by molding material.

The work as shown in Figs. 5 and 6 is placed in a mold with a centrally disposed shaft 43 having knurled portions 44 and a groove 45 for receiving the molding material 46 which, when packed into the mold, fills up the spaces between the commutator segments 40 and the shaft 43 as shown in Fig. 7. After this molding material is hardened, usually by processes including heat and pressure, the ring portion 39 of the commutator indicated by the rectangle $a$, $b$, $c$, and $d$ in Fig. 8 is removed, leaving a plurality of the metal ring insulated segments 40 attached to shaft 43.

One of the principal advantages of the present invention is that there is very little waste of commutator metal. Heretofore the method has been to machine the part shown in Figs. 5 and 6 from a solid rod of copper. This has been very expensive on account of the material wasted and the labor required to cut away the metal. In the present invention, the rectangular piece of copper stock for forming the tube 20 can be made without waste. Obviously there is no waste of material in changing the form of the tube from that shown in Fig. 1 to that shown in Fig. 4.

While the form of embodiment of the present invention, as herein disclosed, constitutes a preferred form, it is to be understood that other forms might be adopted, all coming within the scope of the claims which follow.

What is claimed is as follows:

1. The method of making a commutator which consists in providing a tube of ductile material, forming a flange in said tube, dovetail in cross-section, by deforming the portion of the tube adjacent the inner periphery by applying pressure longitudinally of the tube and against both ends toward the center, slotting the tube through a greater portion of its length so as to provide segments of equal width, held together by the unslotted ring-shaped portion at one end of the tube, placing a shaft in said tube, coaxial therewith, pressing insulating, binding material into said tube so that said material surrounds the shaft and fills the space within said tube and its slots, then cutting off the ring-shaped, unslotted end of the tube.

2. The method of making a commutator which consists in providing a tube of ductile material, forming a flange within said tube by simultaneously deforming the both end portions of the tube adjacent the inner periphery by applying pressure longitudinally of the tube against both ends and toward the center, then applying pressure against the edges of said inner flange to give it a dovetail cross-sectional formation, slotting the so-formed tube for a greater portion of its length to provide segments of equal width, held together by the ring-shaped, unslotted end of the tube, placing a grooved and knurled shaft in said tube so that the shaft is coaxial with the tube and the grooved portion of the shaft lies within the tube, pressing an insulating binder into the space between the shaft and the inner surface of the tube so that the binder enters the spaces between the segments, then cutting off the ring-shaped unslotted end of the tube.

In testimony whereof I hereto affix my signature.

JOHN J. CARTER.